United States Patent
Shah et al.

(10) Patent No.: US 8,237,972 B1
(45) Date of Patent: Aug. 7, 2012

(54) PRINT PREVIEW IN A TAB

(75) Inventors: Roma Shah, San Francisco, CA (US);
Glen Murphy, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/237,560

(22) Filed: Sep. 20, 2011

(51) Int. Cl.
*G06F 3/00* (2006.01)
(52) U.S. Cl. ............ 358/1.15; 705/3; 715/738; 358/1.9
(58) Field of Classification Search ...... 705/3; 715/738, 715/777; 718/100, 103; 358/1.15, 1.9
See application file for complete search history.

(56) References Cited

U.S. PATENT DOCUMENTS

| 7,769,602 B2 * | 8/2010 | Motoki ............................ 705/3 |
| 7,921,365 B2 * | 4/2011 | Sauve et al. .................... 715/738 |
| 2010/0014103 A1 * | 1/2010 | Lee et al. ......................... 358/1.9 |

* cited by examiner

*Primary Examiner* — Benny Q Tieu
*Assistant Examiner* — Ashish K Thomas

(57) ABSTRACT

Methods and systems for printing of a document using tabs. An indication of a print command is received to print a first instance of a document displayed in a first tab on a browser. A second tab is displayed with a second instance of the document upon receiving the indication of the print command, wherein the second tab with the second instance of the document is visible, and the first instance of the document displayed in the first tab is hidden by the second tab displaying the second instance of the document. A print option area is displayed relative to the second instance of the document in the second tab. A final print indication is received from the print option area.

10 Claims, 4 Drawing Sheets

PRINT PREVIEW IN A TAB

BACKGROUND

1. Technical Field

The field relates to operating systems, software applications and user interface devices, and, more particularly, to a system, method, apparatus or non-transitory computer program product of printing, and, in particular, of displaying print options in the same window as the document.

2. Background

A web browser is commonly used with computational devices, such as laptops, smartphones, tablet computing devices, personal digital assistants (PDAs), etc. Web browsers continue to grow in popularity as a tool to access a particular web page, and perform additional features. It is common for a user's homepage to include customized user settings, such as a default web page, and other sources of information. For example, customized web pages may include local weather, email, text messaging, horoscopes, video plug-ins, backgrounds, etc.

The web browser is arguably the most frequently accessed application operated by users of computing devices. Browsers are being used to access more than web pages. For example, it is common to be viewing personal email messages and downloading documents while operating within a browser window space. However, the ability to perform certain functions while actively engaged within the browser window is still limited. For example, printing a document that has been opened inside the browser may face sizing constraints and lack user accessibility. Users often desire a viewable preview of their document's print appearance prior to executing a print job. Previewing a print job may save time, toner and paper and provides increased user satisfaction when available to the user. Also, opening up a new window for the printing may be cumbersome.

BRIEF SUMMARY

In an embodiment, a method may include receiving an indication of a print command to print a first instance of a document displayed in a first tab on a browser; displaying a second tab with a second instance of the document upon receiving the indication of the print command, wherein the second tab with the second instance of the document is visible, and the first instance of the document displayed in the first tab is hidden by the second tab displaying the second instance of the document; displaying a print option area relative to the second instance of the document in the second tab; and receiving a final print indication from the print option area.

In another embodiment, a system may include a print adjustor, implemented with a computing device, configured to perform certain operations. The system may be configured to receive an indication of a print command to print a first instance of a document displayed in a first tab on a browser; display a second tab with a second instance of the document upon receiving the indication of the print command, wherein the second tab with the second instance of the document is visible, and the first instance of the document displayed in the first tab is hidden by the second tab displaying the second instance of the document; display a print option area relative to the second instance of the document in the second tab; and receive a final print indication from the print option area.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
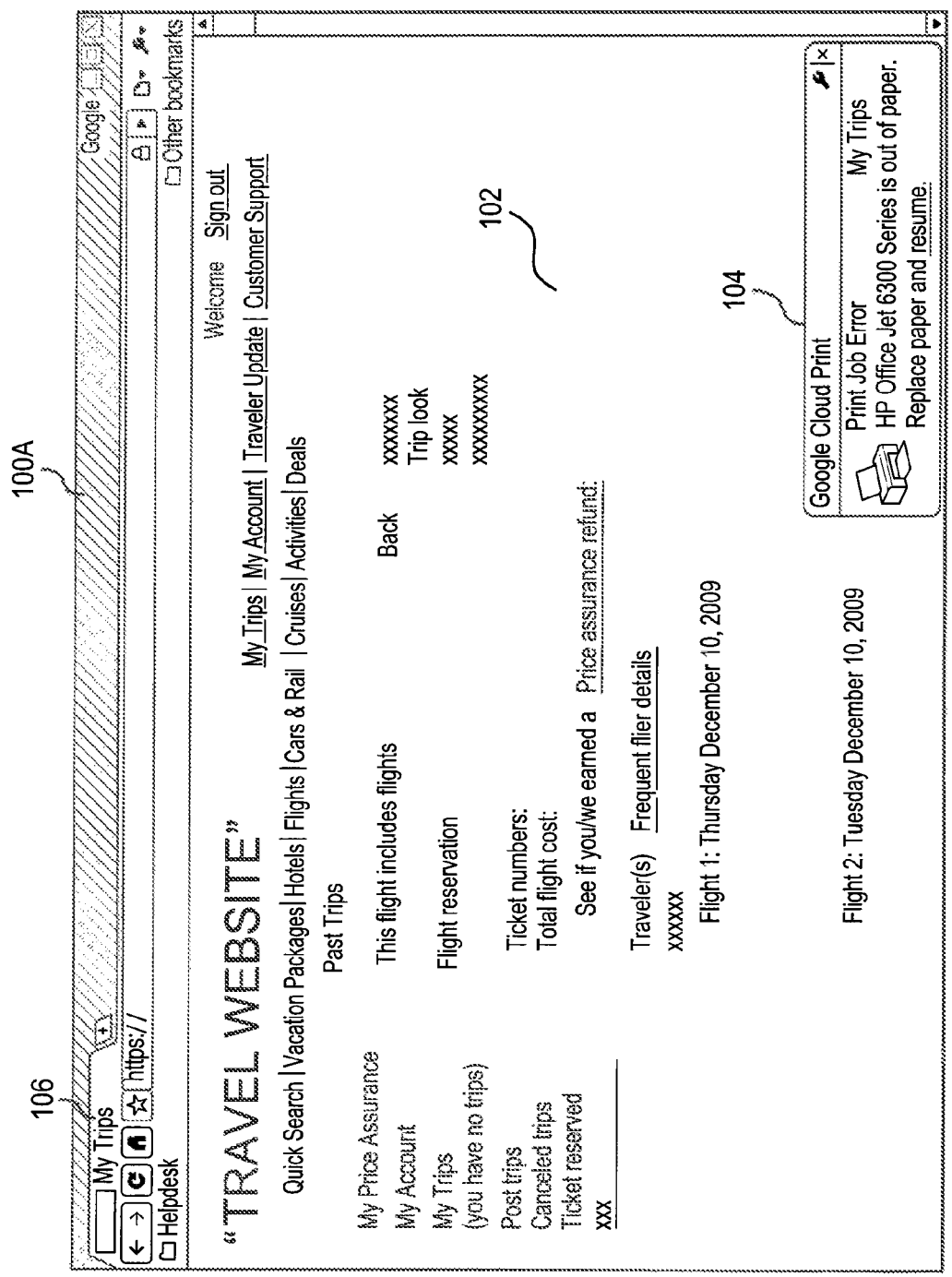
FIG. 1A is an illustration of a web browser displaying a sample document, according to an example embodiment.

FIG. 1A illustrates a web browser displaying a sample document, according to an example embodiment. The sample document of FIG. 1A is the first instance of the document. Referring to FIG. 1A, a browser window 100A is illustrated as including the content of a particular website "travel website." A user may access their personal computing device and select a browser application to browse online websites. One the browser application has been executed, the user may then type in the name of a website into the web address portion of the browser window, or, alternatively, access a search engine to search for a particular website. In this example, the "travel website" may be any website used to search, book and access travel itinerary via a browser application. Other websites or browser-based information sources, which are intended for various purposes, may also be used in accordance with example embodiments disclosed in detail below.

Upon accessing the online website, the user may login or access the website by providing user credentials to access private (user-specific) information. The website may offer options to view personal information related to past visits or user profile information. For example, travel itinerary and/or travel history information is displayed in a central frame portion 102 of the browser window 100A. The user may desire to print the travel itinerary information. The printing may be performed by selecting a browser-based print option, which communicates with a peripheral printing device (not shown).

A print notification 104 is displayed as a window that is part of the browser window 100A. In this example, the print notification 104 is displaying an error indication that the printer is out of paper. The print notification 104 may be displayed automatically by performing an automatic printer status check triggered by a predetermined operation (e.g., opening the browser, accessing a particular document type, selecting a print operation, etc.). All of the content of the browser window 100A is included in a first tab portion 106 "My Trips."

Figure 1B:
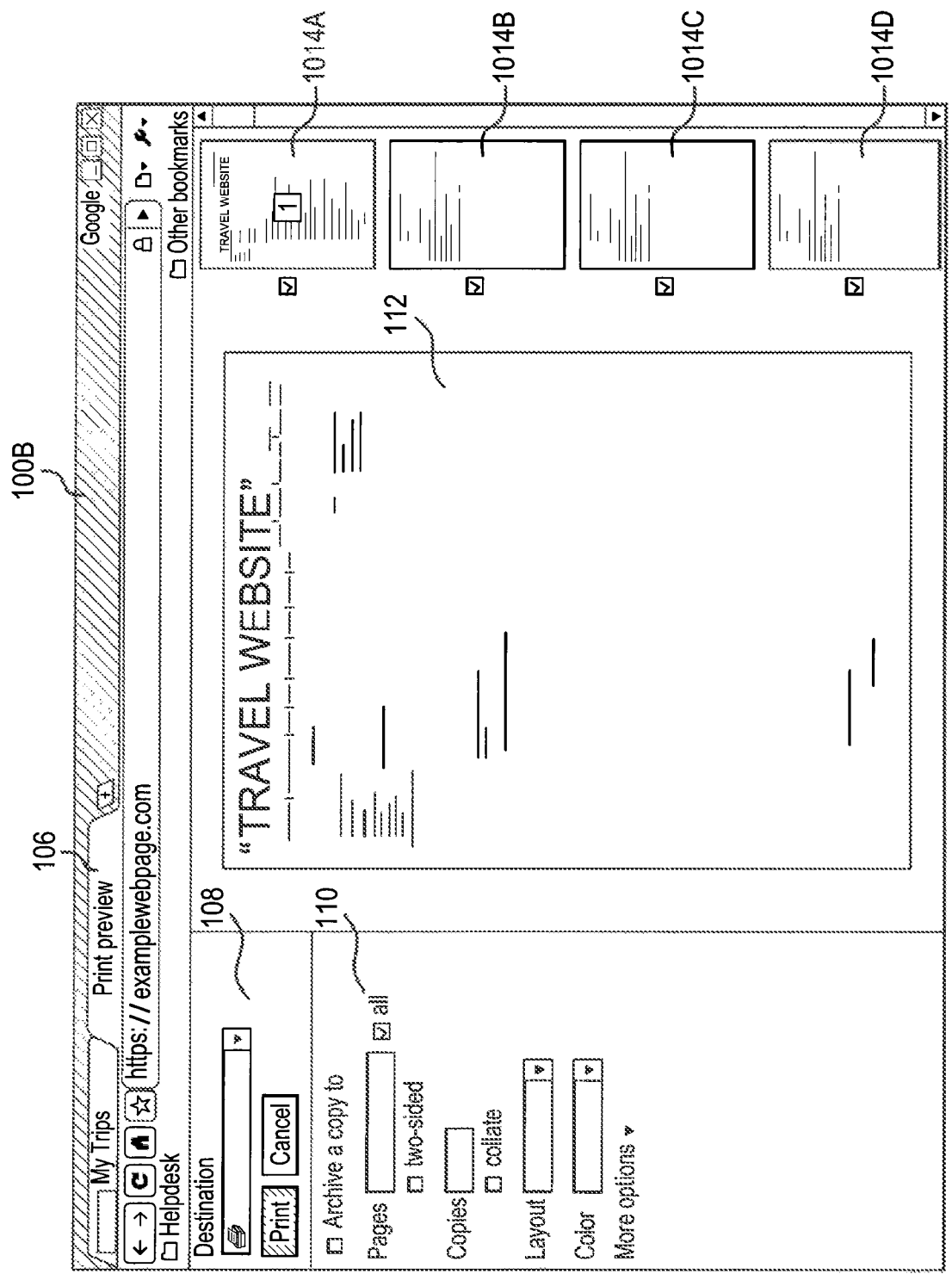
FIG. 1B is an illustration of a web browser displaying a print preview of the sample document, according to an example embodiment.

FIG. 1B illustrates an illustration of a web browser displaying a print preview of the sample document, according to an example embodiment. The print preview is a second instance of the document of FIG. 1A. Referring to FIG. 1B, another view of the browser window 100B is provided with a print preview tab 106 as a new tab that was added when a print preview option was selected by the user. The print preview tab includes a view of the document as it would appear printed onto paper. A print option area may include print options, such as a printer destination 108, and options for printing the pages of the document 110. The print options are presented to the user as part of the browser window 100B. Page 112 is a print preview of the first page of the document as it would appear printed onto paper. Additional pages of the print preview document are illustrated as thumbnails 1014A, 1014B, 1014C and 1014D on the right portion of the browser window.

The user may initiate a print preview tab by selecting a shortcut print option, such as Control +"P." Selecting a print option may automatically initiate a "Print Preview" tab 106, which would seamlessly transition from a current viewable page to a reduced size view version of the document as it would appear on printed paper. These print features may all be present in the context of the browser window 100B. A list of printing options is illustrated on the left side of the browser and the thumbnails are illustrated on the right side of the browser. The print option area 108 includes a "print" option tab. Once a final print indication is received from the user at the print option area 108, the second tab "Print preview" may be automatically closed upon receiving the final print indication.

Figure 2:
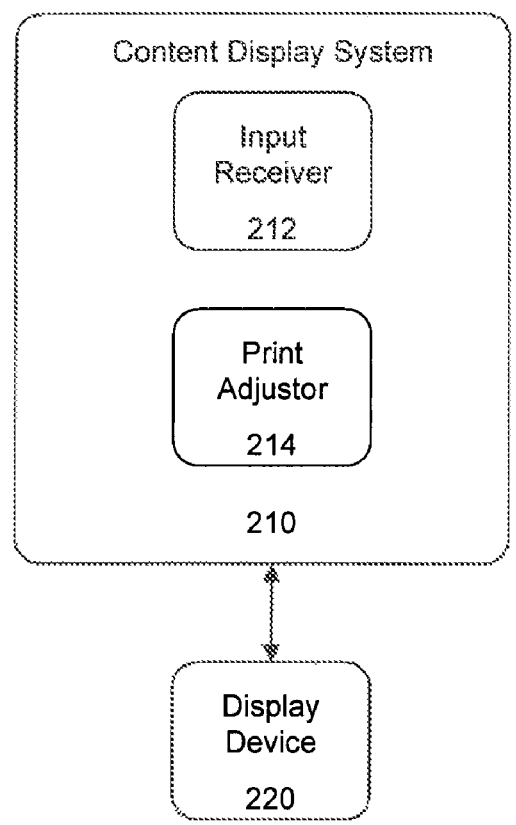
FIG. 2 is an illustration of a content display system, according to an example embodiment.

FIG. 2 is a block diagram of a content display system 210 configured to perform a content display operation, according to an embodiment. System 210, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Content display system 210 may include an input receiver 212 and a print adjustor 214. Content display system 210 is in communication with a display device 220, which may be used to display any of the example display configurations discussed in detail above. The input receiver 212 may receive a command to perform a print operation. The print adjustor 214 may use the command to initiate a print preview display of the document to be printed, such as in the embodiments described above. In a further embodiment, print adjustor 214 may determine print information from and provide print information to the operating system of the computing device. The print preview data may be transmitted to the display device 220 to be viewed by the user. Examples of the embodiments for exemplary system 210 or subsystem components, such as input receiver 212 and print adjustor 214, and methods or any parts or function(s) thereof may be implemented using hardware, software modules, firmware, tangible computer readable or computer usable storage media having instructions stored thereon, or a combination thereof and may be implemented in one or more computer systems or other processing systems.

Figure 3:
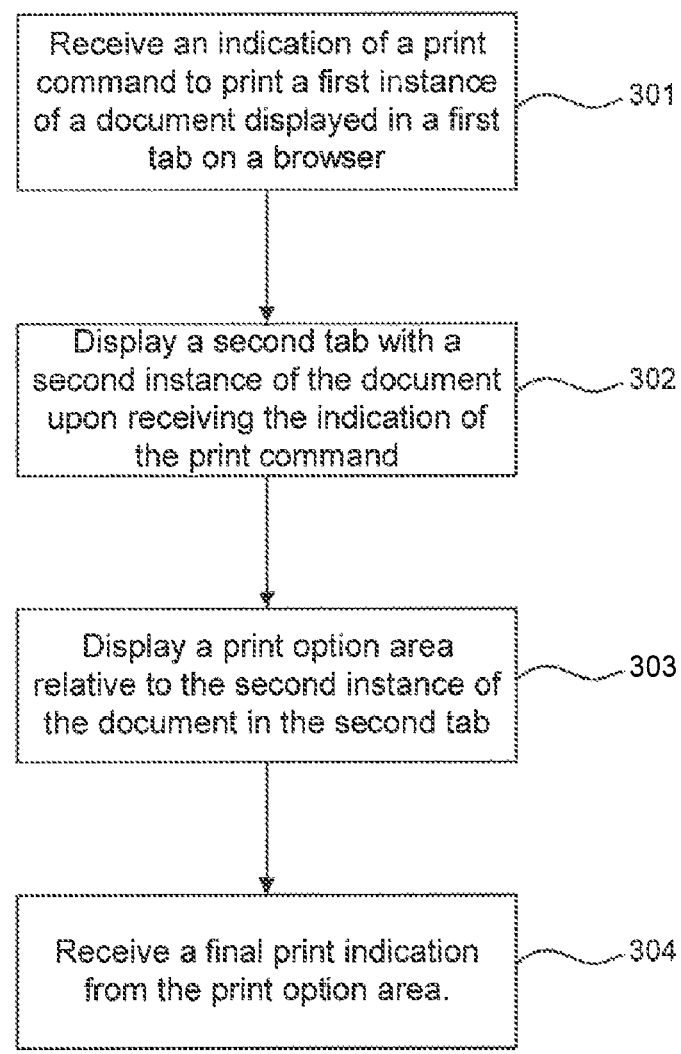
FIG. 3 is an illustration of a flow diagram of an example method of operation, according to an example embodiment.

FIG. 3 is an illustration of a flow diagram of an example method of operation, according to an example embodiment.

Referring to FIG. 3, the method may include receiving an indication of a print command to print a first instance of a document displayed in a first tab at step 301. The tab, can for example, be in a webpage.

A second tab can be displayed with the second instance of the document at step 302. The second tab with the second instance of the document may be visible, and the first instance of the document displayed in the first tab is hidden by the second tab displaying the second instance of the document. A print option area can be displayed relative to the second instance of the document in the second tab at step 303.

The print option area may include one or more functions associated with printing the second instance of the document A final print indication can be received from the print option area at step 304. In one implementation, a print notification is displayed indicating a status of a printing job associated with the second instance of the document.

In one implementation, the second tab can be closed upon receiving the final print indication at step. According to an embodiment, steps 301-304 may be performed by system 210 with the assistance of display device 220.

Embodiments may be directed to computer products comprising software stored on any computer usable medium. Such software, when executed in one or more data processing device, causes a data processing device(s) to operate as described herein.

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
   receiving an indication of a print command to print a first instance of a document displayed in a first tab in a browser;
   displaying, upon receiving the indication of the print command, a second tab with a second instance of the document in the browser, wherein the second tab with the second instance of the document is visible, and the first instance of the document displayed in the first tab is hidden by the second tab displaying the second instance of the document;
   displaying a print option area relative to the second instance of the document in the second tab; and
   receiving a final print indication from the print option area.

2. The method of claim 1, wherein the print option area is displayed on the left side of the second tab relative to the second instance of the document.

3. The method of claim 1, wherein the print option area includes one or more functions associated with printing the second instance of the document.

4. The method of claim 1, further comprising:
   closing the second tab upon receiving the final print indication.

5. The method of claim 1, further comprising:
   displaying a print notification indicating a status of a printing job associated with the second instance of the document.

6. A system, comprising:
   a print adjustor, implemented with a computing device, configured to:
   receive an indication of a print command to print a first instance of a document displayed in a first tab on a browser;
   display, upon receiving the indication of the print command, a second tab with a second instance of the document in the browser, wherein the second tab with the second instance of the document is visible, and the first instance of the document displayed in the first tab is hidden by the second tab displaying the second instance of the document;
   display a print option area relative to the second instance of the document in the second tab; and
   receive a final print indication from the print option area.

7. The system of claim 6, wherein the print option area is displayed on the left side of the second tab relative to the second instance of the document.

8. The system of claim 6, wherein the print option area includes one or more functions associated with printing the second instance of the document.

9. The system of claim 6, wherein the print adjustor is further configured to:
   close the second tab upon receiving the final print indication.

10. The system of claim 6, wherein the print adjustor is further configured to:
    display a print notification indicating a status of a printing of the second instance of the document.

* * * * *